(12) United States Patent
Gust

(10) Patent No.: US 8,049,720 B2
(45) Date of Patent: Nov. 1, 2011

(54) COMPACT OPTICAL POINTING APPARATUS AND METHOD

(75) Inventor: Lawrence Alan Gust, Round Lake Park, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 622 days.

(21) Appl. No.: 11/456,719

(22) Filed: Jul. 11, 2006

(65) Prior Publication Data

US 2006/0244722 A1 Nov. 2, 2006

Related U.S. Application Data

(62) Division of application No. 10/331,432, filed on Dec. 30, 2002, now Pat. No. 7,102,617.

(51) Int. Cl.
*G06F 3/033* (2006.01)

(52) U.S. Cl. ......... 345/158; 345/156; 345/173; 345/166

(58) Field of Classification Search .......... 345/156–158, 345/165, 166, 173, 179, 204; 455/556.1, 455/556.2

See application file for complete search history.

(56) References Cited

U.S. PATENT DOCUMENTS

| | | |
|---|---|---|
| 5,463,725 A | 10/1995 | Henckel et al. |
| 5,732,148 A | 3/1998 | Keagy et al. |
| 5,796,858 A | 8/1998 | Zhou et al. |
| 5,838,306 A | 11/1998 | O'Connor et al. |
| 5,978,495 A | 11/1999 | Thomopoulos et al. |
| 5,991,431 A | 11/1999 | Borza et al. |
| 6,057,540 A | 5/2000 | Gordon et al. |
| 6,219,793 B1 | 4/2001 | Li et al. |
| 6,400,836 B2 | 6/2002 | Senior |
| 6,424,407 B1 | 7/2002 | Kinrot et al. |
| 6,473,069 B1 | 10/2002 | Gerpheide |
| 6,614,422 B1 | 9/2003 | Rafii et al. |
| 6,624,824 B1 | 9/2003 | Tognazzini et al. |
| 6,654,007 B2 * | 11/2003 | Ito ................................ 345/175 |
| 6,677,929 B2 * | 1/2004 | Gordon et al. ................ 345/156 |

(Continued)

FOREIGN PATENT DOCUMENTS

CN 1233791 A 3/1999

(Continued)

OTHER PUBLICATIONS

Chinese Office Action for Application No. 2003/80107859.2; Jun. 8, 2007; pp. 1-10.

(Continued)

*Primary Examiner* — Kimnhung Nguyen

(57) ABSTRACT

A display pointing device (10) includes a fingerprint sensing circuit (18) that optically senses, for example, a portion of a fingerprint or other skin texture, and a fingerprint movement detection circuit (20), operatively coupled to the fingerprint sensing circuit (18), that is operative to determine a direction of movement and a rate of movement of skin texture being sensed by the fingerprint sensing circuit (18) to produce pointing output data (24) for a display (12). The pointing output data (24) may be, for example, data representing a visual indication of a position on a display screen, such as a position of a cursor or of highlighted text, or any other suitable position indication. A method for providing pointing information for display includes sensing a fingerprint, determining a direction of movement and a rate of movement of the fingerprint and producing a pointing output for display based on a determined direction of movement and rate of movement of the sensed fingerprint.

20 Claims, 5 Drawing Sheets

U.S. PATENT DOCUMENTS

| | | | |
|---|---|---|---|
| 6,707,027 | B2 | 3/2004 | Liess et al. |
| 6,795,056 | B2 | 9/2004 | Norskog et al. |
| 6,809,723 | B2 * | 10/2004 | Davis .......................... 345/166 |
| 6,823,077 | B2 * | 11/2004 | Dietz et al. ................... 382/107 |
| 7,425,945 | B2 * | 9/2008 | Arrigo et al. .................. 345/165 |
| 2002/0093487 | A1 | 7/2002 | Rosenberg |
| 2002/0104957 | A1 | 8/2002 | Liess et al. |
| 2003/0076306 | A1 | 4/2003 | Zadesky et al. |
| 2004/0125072 | A1 | 7/2004 | Gust |

FOREIGN PATENT DOCUMENTS

| | | | |
|---|---|---|---|
| CN | 1378169 | A | 11/2002 |
| JP | 2001155137 | A | 6/2001 |
| KR | 1020000029097 | A | 5/2000 |
| WO | 9718546 | A1 | 5/1997 |
| WO | 0016244 | A | 3/2000 |

OTHER PUBLICATIONS

Office Action from U.S. Patent Office; U.S. Appl. No. 10/331,432; mailed Dec. 21, 2004.

Response to Office Action mailed Dec. 21, 2004; U.S. Appl. No. 10/331,432; dated Jan. 27, 2005.

Office Action from U.S. Patent Office; U.S. Appl. No. 10/331,432; mailed Jun. 14, 2005.

Response to Office Action mailed Jun. 14, 2005; U.S. Appl. No. 10/331,432; dated Jul. 14, 2005.

Office Action from U.S. Patent Office; U.S. Appl. No. 10/331,432; mailed Sep. 21, 2005.

Response to Office Action mailed Sep. 21, 2005; U.S. Appl. No. 10/331,432; dated Jan. 23, 2006.

Microsoft Mice; Take Control with IntelliEye technology; Microsoft Corporation, 2001.

International Search Report for International Application No. PCT/US03/37962 dated Oct. 12, 2004.

Chinese office action; for Chinese Application No. 200380107859.2; dated May 22, 2009.

Polish office action; for Polish Application No. P377273; dated May 4, 2009.

EP Search Report; EP Application No. 03790129.5; dated Dec. 10, 2009; pp. 1-3.

Korean Office Action; Korean Application No. 10-2005-7012257; dated Apr. 5, 2010.

Russian Office Action; Russian Application No. 2005124284; dated Jun. 26, 2008.

Russian Office Action; Russian Application No. 2005124284; dated Nov. 2007.

Chinese Decision on Rejection; Chinese Application No. 200380107859.2; dated Jan. 8, 2010.

Chinese Notification of Reexamination; Chinese Application No. 200380107859.2; dated Sep. 27, 2010.

* cited by examiner

COMPACT OPTICAL POINTING APPARATUS AND METHOD

RELATED CO-PENDING APPLICATION

This application is a divisional of U.S. application Ser. No. 10/331,432 filed Dec. 30, 2002, entitled "COMPACT OPTICAL POINTING APPARATUS AND METHOD", having as inventor Lawrence Alan Gust, and owned by instant assignee, now issued as U.S. Pat. No. 7,102,617.

FIELD OF THE INVENTION

The invention relates generally to display pointing devices, and more specifically, to optical pointing devices.

BACKGROUND OF THE INVENTION

A pointing device, such as a mouse, allow a user to point to a position on a screen to interactively position a cursor or select a position on a display surface, such as a display screen or other suitable surface. Such pointing devices are known to be used in desktop computers, mobile devices, laptop computers, cell phones, PDAs, Internet appliances and other devices. The pointer on a display may be textual (e.g., highlighted text) or graphical (e.g., cursor).

User interfaces on portable consumer electronic products are getting more complex. This complexity generally requires more controls for the user to manipulate. However, consumer demands typically require products that are small and compact. It can be difficult to include sufficient controls and still keep the device small enough for consumer acceptance. There is also a practical limit on how small controls, such as buttons, may be placed with respect to each other and still remain operable by an average user's finger.

Two major classes of pointing devices exist on portable consumer electronic products, namely one dimensional and two dimensional pointing devices. A one dimensional pointing device may include, for example, thumbwheels, spinners, sliders, multi-position toggle switches, and rocker switches. These pointing devices are used to select movement in one dimension in a user interface, such as a graphical user interface, or other suitable interface. Movement in one dimension is generally interpreted as one of an up/down, forward/back and next/previous depending on the context of the product.

One dimensional pointing devices, such as wheels, can be constructed to use very little of the inherently limited surface area of a consumer product. For example, the edge of a wheel may be extended through a slot opening in a product housing and permit a user to roll the wheel in both directions by dragging a finger along the wheel edge tangent to its circumference. A disadvantage of such wheel controls is that the slot openings in the housing permit contaminants to enter the product.

Toggle switches and rockers are typically larger than wheels, and they require a surface area pad large enough to receive a user's fingertip. In some cases, rocker switches are implemented as two adjacent buttons linked by a common button bar. These devices can be engineered to preserve the environmental seal of the housing of the product. However, such devices have the disadvantages that they contain moving parts and can take up larger surface areas of the device compared to the other one-dimensional alternatives listed previously.

Two dimensional pointing devices include, for example, track pads, track balls, mice, joy sticks, and other devices. These types of pointing devices are typically used to select movement in two dimensions simultaneously within a user interface. Any two dimensional pointing device can also be used as a one dimensional pointing device if desired by trivially ignoring one of the dimensions sensed by the device. Two dimensional pointing devices are much more versatile than one dimensional pointing devices. Typically, two dimensional pointing devices are used to select and manipulate information in a two dimensional display by indicating a position (X, Y) on the display, where that position (X, Y) is associated with a function by way of a graphical user interface. Alternatively, a two dimensional pointing device can be used to control two independent aspects of a device, such as pitch versus timbre, and ailerons versus rudder, interest rate versus term.

Trackpads are flat surface areas that sense the absolute contact location of the user's fingertip on the flat surface area. A minimum size of a trackpad must therefore be somewhat larger than a user's fingertip to be effective; practically they exceed several times the size of the user's fingertip. An advantage of trackpads is that they usually require very little depth within a device housing with respect to the surface area that they require, and they can be environmentally sealed. However, due to the amount of surface area that trackpads require, they are not typically common on smaller products like handheld devices.

Track balls utilize a rolling sphere to provide a relative motion indication output for a user interface. The user touches the sphere and causes it to roll. The roll angle of the sphere is sensed to determine two-dimensional pointing information. The minimum diameter of a track ball is constrained by, for example, the size of the sensing apparatus used to determine rotation. A disadvantage of track balls is that they require depth within a housing on the same order of the track ball diameter. However, many portable consumer electronic products do not have the necessary depth to accommodate a track ball pointing device and related sensing mechanisms. In addition, track balls cannot be environmentally sealed and thus also permit contaminants to enter the product.

Joy sticks are typically not used in portable consumer electronic products, typically because they must project above the surface of the product and they can generally require significant volume or depth within the product for the sensing mechanisms. A variant of a joy stick, commonly referred to as a joybutton or hat switch, is usually implemented as a two-dimensional rocker switch. Among the disadvantages shared by a joybutton and a hat switch are that the device generally cannot indicate speed or distance, only direction.

The most common type of prior art mouse pointing device (plural: mice) operates substantially like an inverted track ball. Instead of the user touching and rolling the sphere directly, the user moves an entire housing containing the inverted track ball upon an auxiliary flat surface (a mouse pad) separate from the housing. The auxiliary flat surface has a minimum size determined by the size of the mouse housing, and in practice the minimum size of such a mouse pad is significantly larger than a user's palm. In use, the friction between the sphere and the mouse pad causes the sphere to rotate within the housing, at which point the remainder of the operation is similar to a track ball device. In addition to all of the disadvantages of a track ball, such existing prior art mice also appear to have the disadvantage of requiring the auxiliary flat surface, and the sensing of motion is necessarily conducted on the bottom of the housing.

Another prior art mouse implementation requires a fine regularly repeating optical pattern or grid printed on the mouse pad surface, on which the user slides an optical mouse. This type of optical mouse uses sensors necessarily on the bottom surface of the housing that are placed at a specific pitch relative to the grid on the mouse pad surface and thus senses the relative motion of the known grid underneath it and uses that information to sense direction and speed. However, disadvantages of the additional grid surface include the requirement for the mouse pad itself, and that the mouse pad is typically hard to keep clean and free from damage, the mouse pad is typically several times larger than the user's palm, and the user must take care to keep the orientation of the optical mouse consistent with the orientation of the grid on the mouse pad.

Another type of optical mouse such as an IntelliEye Optical Sensor™ marketed by Microsoft Corporation of Redmond, Wash. uses optical sensors and image processing techniques to determine relative motion. As with all other prior art mice implementations, this product requires an auxiliary surface on which to operate. This product is differentiated from the optical grid mouse previously cited in that it does not require a separate optical repeating grid pad and it uses a plurality of sensor arrays and an image processor to determine speed and direction of motion of a flat smooth surface below it. The sensor arrays are thus necessarily positioned on a bottom surface of the optical mouse. A flat sensing window on the bottom of the mouse receives light for the optical sensor arrays. In operation, a flat area, such as the top of a desk, is required to use the mouse. The minimum size of the flat area is at least as large as the mouse housing, which is about the size of a user's palm, and in practice the flat area required is several times larger than a user's palm. As such, an improved display pointing device would be desirable for portable consumer devices.

BRIEF DESCRIPTION OF THE DRAWINGS

The invention will be more readily understood with reference to the following drawings wherein.

DETAILED DESCRIPTION OF A PREFERRED EMBODIMENT

Figure 1:
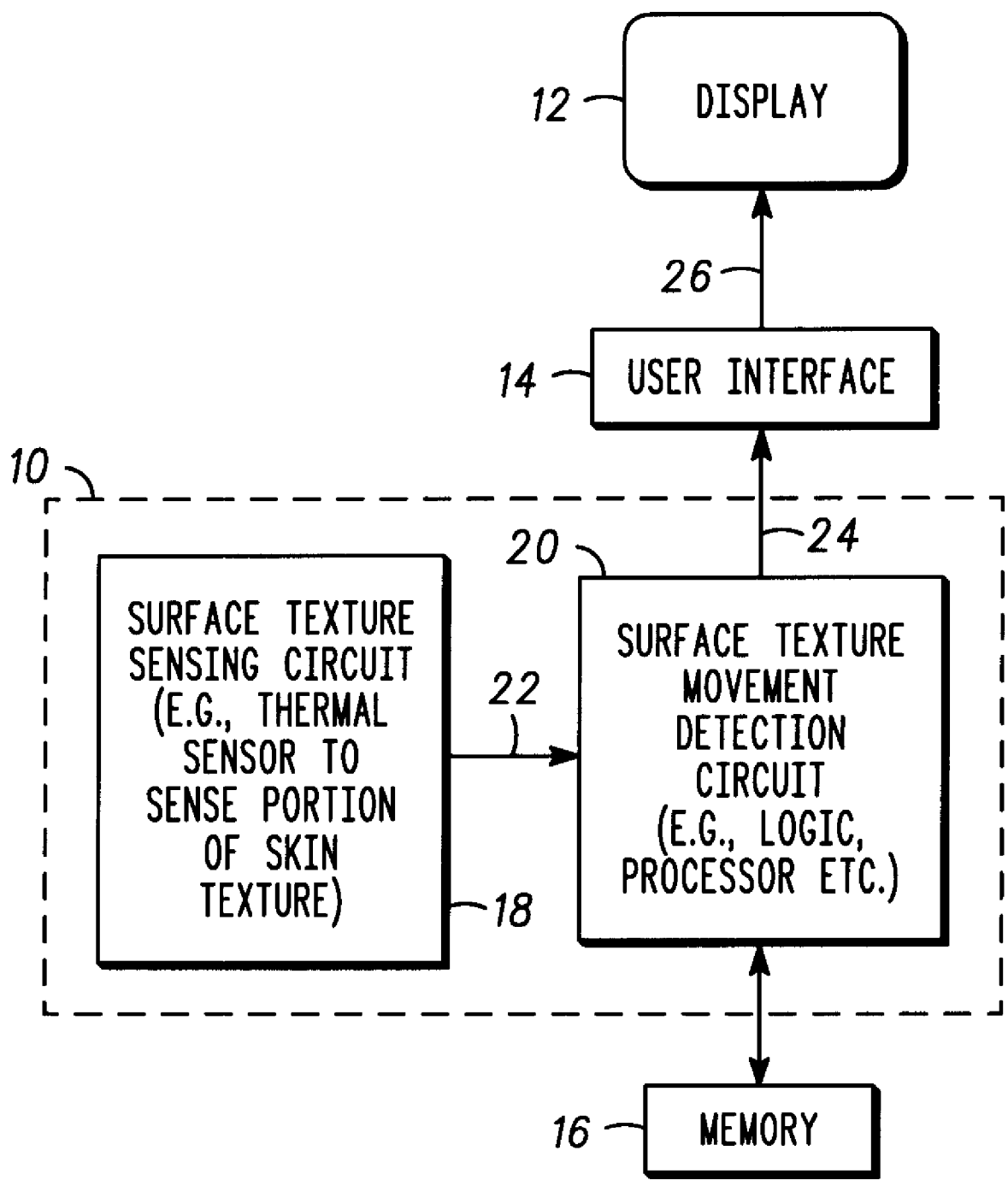
FIG. 1 is a block diagram illustrating one example of a display pointing device in accordance with one embodiment of the invention.

Briefly, a display pointing device includes a surface texture sensing circuit that senses, for example, a portion of a surface, such as a finger or other skin texture, and a surface texture movement detection circuit, operatively coupled to the surface texture sensing circuit, that is operative to determine a direction of movement and a rate of movement of skin texture being sensed by the surface texture sensing circuit to produce pointing output data for a display. The pointing output data may be, for example, data representing a visual indication of a position on a display screen, such as a position of a cursor or of highlighted text, or any other suitable position indication. A method for providing pointing information for display includes sensing a surface texture, determining a direction of movement and a rate of movement of the surface texture and producing a pointing output for display based on a determined direction of movement and rate of movement of the sensed surface texture. In one example, the method includes resolving data received from the surface texture sensing circuit to produce a first image, storing the first image, and comparing the first image to one or more previously stored images to determine whether movement of the surface texture has occurred and if so, the rate and direction of movement.

In another embodiment, a mobile device, such as a laptop device, handheld device, or other suitable mobile device, incorporates a surface texture sensing circuit with a small surface area referred to as a sensing window, to detect skin texture patterns, such as ridges and furrows, in a user's fingertip that is used as a type of optical pattern to sense motion past the sensing window. It is not necessary that the optical pattern of the user's fingertip be uniform. In one example, rows of charged coupled devices (CCD's) are employed in conjunction with a visible light filter to allow infrared light to pass to the charged coupled devices. Also if desired, a focusing mechanism, such as a focusing lens, may be employed as a sensing window and is positioned to focus infrared energy that is above the sensing window, such as, as high as 0.7 mm or any other suitable distance, so that a user's fingerprint, skin texture or other surface texture need not contact the sensing surface to be detected. The charged coupled devices are formed as a sensing array. In another embodiment, thermal sensing arrays are used that are responsive to non-visible light so that a filter is not necessary.

In another embodiment, the surface texture sensing circuit is embedded in a depressible button in a device so that the button can be used both as the surface area that houses the sensing window and as the surface area used to depress to activate the button for accommodating activation by a user. Hence the sensing window is co-located within a button key or other control surface. In alternative embodiments, the sensing window is located between other keys or buttons or may be located in any other suitable area separate from any other control keys or buttons. The sensing window is located on a non-bottom surface of, for example, a mobile device and as such may be located, for example, on a side surface, top surface, or other non-bottom surface. Among other advantages, no moving parts are required and only a small surface area is necessary to facilitate control of a cursor or other suitable user interface mechanism. In addition, use of infrared wavelengths may allow penetration through deposits of dirt or other film that may potentially blind purely optical sensors, such as those that use visible light laser emitter technologies. However, it will also be recognized that such technologies may be employed as a fingerprint sensing circuit as described herein.

FIG. 1 illustrates one example of a display pointing device 10 that for purposes of illustration, is shown to be employed within a device that includes a display 12, a user interface 14, and memory 16. The display pointing device 10 includes a surface texture sensing circuit 18, such as an optical fingerprint sensing circuit, and a surface texture movement detection circuit 20. The memory 16 may alternatively be included as part of the surface texture sensing circuit and/or surface texture movement detection circuit. As used herein, the term "fingerprint" includes any portion of skin texture or other texture and does not refer to an entire fingerprint and is not limited to skin texture associated with a finger. As such, the surface texture sensing circuit 18 is operative to sense at least a portion of, for example, a fingerprint or other suitable skin pattern, or other surface such as a glove, that is placed on or in proximity to a sensing window of the surface texture sensing circuit.

The surface texture sensing circuit 18 outputs information representing one or more detected skin texture images 22 for the surface texture movement detection circuit 20. The surface texture sensing circuit 18 includes an optical sensing array that includes, for example, charged coupled device (CCD's), an array of thermal sensors, an illumination source (e.g., light emitter) based reflection system or any other suitable optical surface texture sensing mechanism. One example of a thermal surface texture sensor is Fingerchip model FCD4A14, marketed by STMicroelectronics of Geneva, Switzerland, which includes a rectangular array of temperature sensors. The surface texture sensing circuit 18 may alternatively include a light emitter, such as a common light emitting diode (LED), operatively positioned to illuminate skin texture on a fingertip or other skin portion to facilitate sensing of skin texture. LED devices are available from numerous vendors and distributors and are available in a wide variety of emitted wavelengths including visible light and infrared. LED vendors include LEDtronics of Torrance, Calif., DiaLight of Cambridge, England, and LiteOn of Taipei, Taiwan.

The embodiment of the present invention that uses LED illumination differs from laser-based coherent interferometry, such as Optical Translation Measurement owned by OTM Technologies Ltd. of London, England, and being developed by GOU Lite Ltd. of Herziyla, Israel, in a plurality of ways, including that that the light source of the present invention need not be a coherent light source, and the present invention does not require a near-surface grating. In the instance where an active light emitter based sensor is used, an active light emitter in one or both of visible and infrared light spectrums may be used for local illumination of a user's fingertip. The required light output of the emitter may be very low due to the small surface area that would benefit from illumination and due to the close proximity of the user's finger to the sensing window.

The surface texture sensing circuit 18 resolves data received from optical sensors of the surface texture sensing circuit to produce an image of a fingerprint, such as a portion of a fingerprint or other skin texture which image may represent, for example, ridges and furrows of a user's fingertip, or other suitable surface texture, as a type of optical pattern. The surface texture movement detection circuit 20 uses ridges and furrows in skin texture as an optical pattern to sense motion and a rate of motion of the skin texture as the finger is being passed over a sensing window.

The surface texture movement detection circuit 20 may be a microcontroller, discrete logic, microprocessor, state machine, or any suitable combination of hardware, software or firmware. The surface texture movement detection circuit 20 is operatively coupled to the surface texture sensing circuit 18 to receive one or more skin texture images 22 and determines at least one of direction of movement and/or rate of movement of skin texture being sensed by the surface texture sensing circuit 18. Preferably, both the direction of movement and the rate of movement are determined. The surface texture movement detection circuit 20 produces pointing output data 24 for display 12. As shown in this example, the pointing output data 24, which represents, for example, the position on a display pointed to by a user's fingertip, used by a user interface 14, such as a graphic user interface or other suitable interface, so that the user interface may provide a visual indication of the position on the display. In this example, the user interface 14 outputs a cursor position 26 that is displayed on display 12. It will also be recognized that the pointing output data 24 may be any suitable data representing visual indication of a position on the display including, but not limited to, highlighted or selected text, or any other suitable visual indication.

The memory 16 may be part of a device or included as part of the surface texture movement detection circuit or surface texture sensing circuit 18, if desired. It will also be recognized that any suitable portion of the surface texture sensing circuit 18 may be employed in the surface texture movement detection circuit and vice versa. In any event, the surface texture movement detection circuit 20, in this example, stores an image received from the surface texture sensing circuit in memory 16. It then determines the rate and direction of movement of a surface texture by comparing the stored image to one or more previously stored images received from the surface texture sensing circuit 18.

Figures 2, 3:
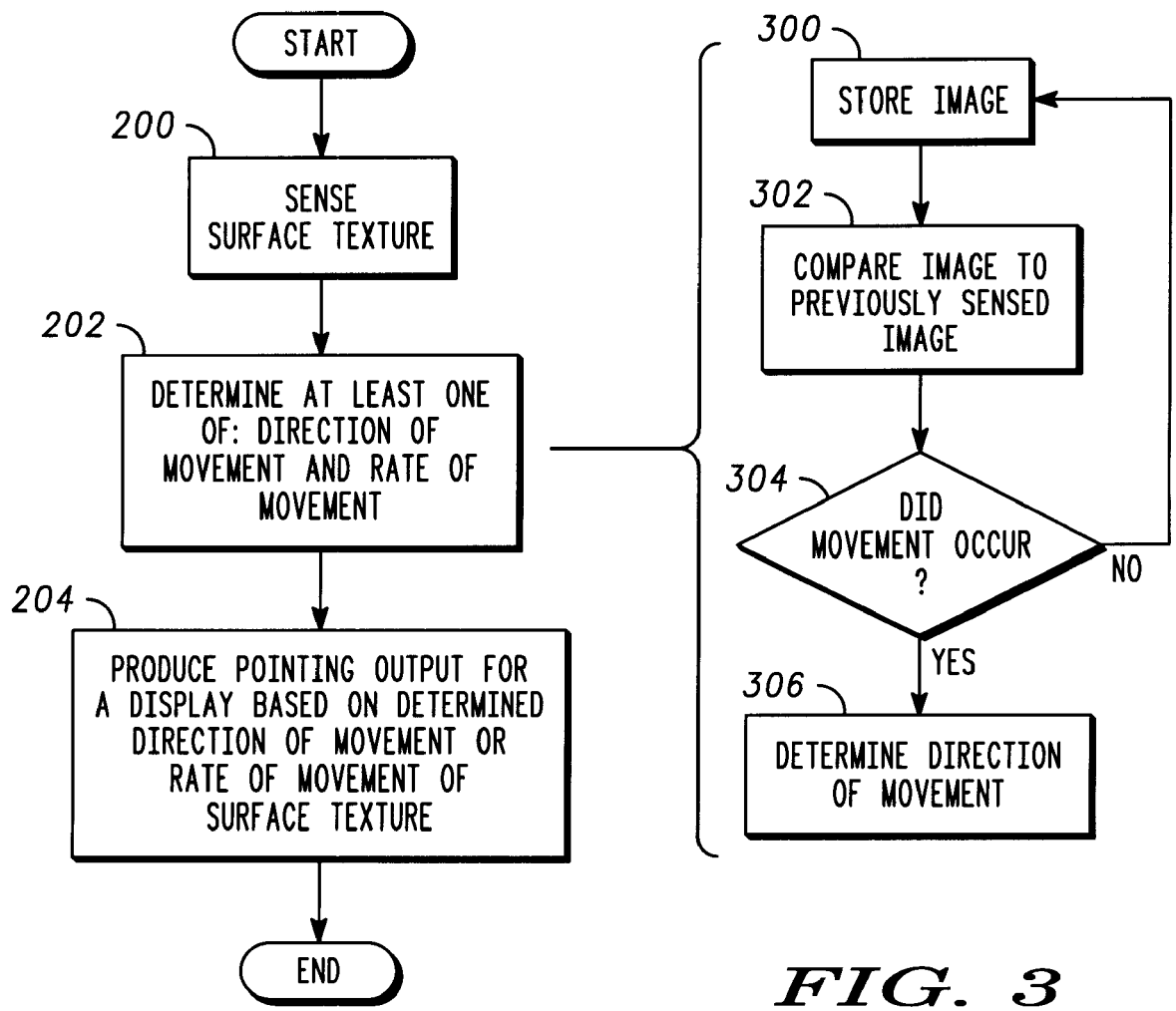
FIG. 2 is a flow chart illustrating one example of a method for providing pointing information for a display in accordance with one embodiment of the invention.
FIG. 3 is a block diagram illustrating in more detail one example of determining a direction of movement or a rate of movement, or both, of a surface texture, such as a fingerprint or other surface texture in accordance with one embodiment of the invention.

FIG. 2 illustrates one example of a method for providing pointing information for a display, such as that carried out, for example, by the display pointing device 10 of FIG. 1. However, any suitable device or combination of devices or circuits may carry out the disclosed method. As shown in block 200, the method starts by sensing a surface texture. This may be done through any suitable surface texture sensing mechanism. As shown in block 202, the method includes determining at least one of a direction of movement of a surface texture and a rate of movement of a surface texture as it is passed along a sensing window associated with the display pointing device 10. In block 204, the method includes producing pointing output data for a display based on a determined direction of movement and/or rate of movement of the surface texture. Referring again to block 200, sensing the surface texture includes, in this example, resolving received optical data from a surface texture sensor, such as a charged coupled device array, thermal sensing array or any other suitable light sensor, and generating data representing an image of the sensed surface texture.

Figure 7:
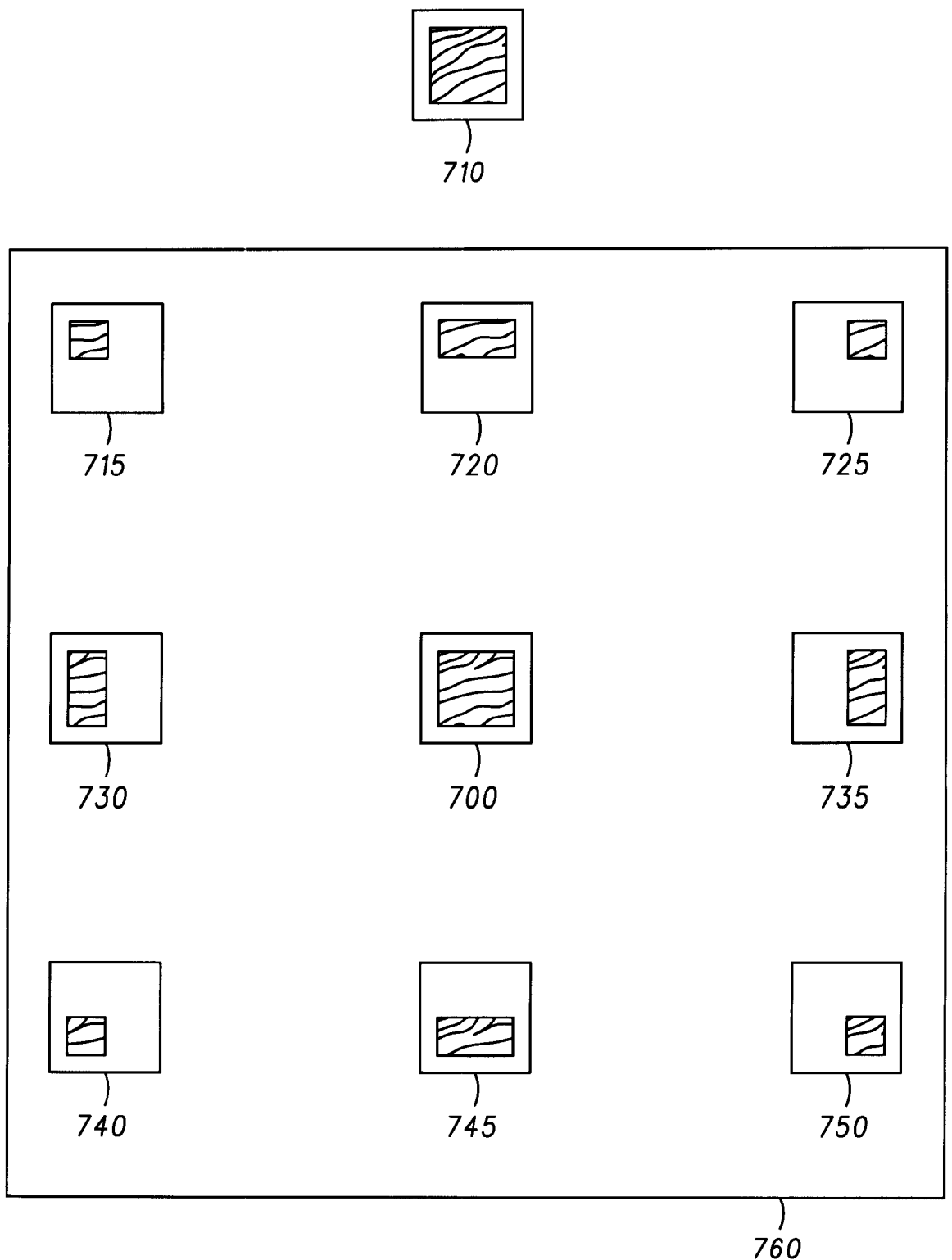
FIG. 7 is a diagram illustrating data structures representing frames for a sample iteration of the method shown in FIG. 3.

FIG. 3 is a flow chart illustrating one example of a method for determining at least one of a direction of movement and a rate of movement of a fingerprint in accordance with one embodiment of the invention. FIG. 7 illustrates data structures representing frames for a particular sample iteration of the flow chart of FIG. 3. As shown in block 300, the method includes storing one or more received images from a surface texture sensor such as a fingerprint sensor. As shown in block 302, the method includes comparing a received image 710 to one or more previously sensed fingerprint images 760. As shown in block 304, the method includes determining from the comparison whether movement of the image occurred. In the trivial case, no motion has occurred and the received image 710 substantially matches the stored image 700. When two images substantially match, they are said to have high correlation. Another way to describe substantially matching is to compute a score based on correlation where a higher score indicates a better correlation.

Each image 710 received from the surface texture sensing circuit 18 may be, for example, a set of pixels received during a period of time and as such may be considered a frame of information. As such, the finger movement detection circuit 20 may carry out any suitable motion detection algorithms including, for example, the generation of motion vectors for a portion of an image or whole image such as that used in motion video coding and compression such as aspects of Moving Picture Experts Group (MPEG) encoding standards, or any other suitable motion detection techniques. MPEG encoding hardware is available from a plurality of vendors, an example includes the Flexicoder product marketed by Harris Corporation of Palm Bay, Fla. Detailed descriptions of MPEG encoding, correlation, and block motion estimation are available in Purcel et al., U.S. Pat. No. 5,608,656, Ishii et al. U.S. Pat. No. 5,157,732, Gobert et al. U.S. Pat. No. 5,247,586 and Tsukagoshi U.S. Pat. No. 5,461,423, incorporated herein by reference.

Referring again to FIGS. 3 and 7, in the non-trivial case where motion has occurred, the received image 710 and the stored image 700 will have substantial differences and a motion detection algorithm is employed used to determine the direction and magnitude of the movement. In a preferred embodiment, a saved image 700 is subjected to at least one of the image processing transformations of translation, rotation, and scaling, to produce a plurality of candidate images 715, 720, 725, 730, 735, 740, 745, 750, which may be stored in storage 760. In the illustrated example of FIG. 7, candidate image 715 is a translation up and to the left with respect to saved image 700; candidate image 720 is a translation up with respect to the saved image 700; candidate image 725 is a translation up and to the right with respect to the saved image 700; candidate image 730 is a translation to the left with respect to the saved image 700; candidate image 730 is a translation to the right with respect to the saved image 700; candidate image 740 is a translation down and to the left with respect to saved image 700; candidate image 745 is a translation down with respect to the saved image 700; and candidate image 750 is a translation down and to the right with respect to the saved image 700. The candidate images 715, 720, 725, 730, 735, 740, 745, 750 are then compared against the received image 710 and if they substantially match, then the image processing transformation used to produce the candidate image is representative of the motion of the skin texture. If the candidate does not match, then a different transformation or set of transformations are attempted, for example, shifting the saved image or the transformed image to the left by a larger amount, or shifting to the right. The first translation attempted may be selected by use of a history of recent previously determined directions and magnitudes or other means, such as MPEG block displacement vectors.

By repetitively attempting to compare or correlate the received image 710 against the various candidate transformations 715, 720, 725, 730, 735, 740, 745, 750, one of two outcomes are possible. A first outcome is that eventually a portion of a transformed candidate image (735) substantially matches a corresponding portion of the received image 710, in which case the motion of the skin texture has been determined from the translation that was applied to the saved image 700 producing the respective candidate image 735, and the pointing output 204 is generated. A second outcome is that no candidate transformation has sufficient correlation with the received image to reasonably identify the motion. This second outcome generally implies that the motion of the skin texture was at such a large magnitude that it cannot accurately be measured, for example a completely different portion of skin texture with different ridges and furrows is represented in the received image in comparison to the stored image. In a preferred embodiment, in the second outcome the invention uses a history of previous determinations of direction and speed to determine if the motion was likely to be a large magnitude. If the history indicates accurate determination of a consistent direction and increasing magnitude, the invention returns direction consistent with the previous directions and a rate of movement corresponding to the maximum rate of movement that would otherwise be detectable, thus providing a speed-limiting function in the event of large magnitude displacements of skin texture. If the history does not indicate a consistent direction and increasing magnitude, then the direction and speed consistent with a stationary skin texture is provided.

In an alternate embodiment, the received image is subjected to at least one of the image processing transformations of translation, rotation, and scaling, for example, translating an image to the left by a small increment to produce a candidate image, which may be stored. The candidate image is then compared against a saved image and if they substantially match, then the image processing transformation used to produce the candidate image is representative of the inverse of the motion of the skin texture. If the candidate does not match, then a different transformation is attempted, for example, shifting the received image or the transformed image to the left by a larger amount, or shifting to the right. This alternate embodiment operates along substantially the same rules as the preferred embodiment described immediately above, except that the transformations are applied to the received image instead of the saved image, the comparison is made between the candidate transformed received images against a saved image instead of a candidate transformed saved image against the received image, and the resolved direction will be the inverse of the transformation applied to the received image.

The present invention requires at least one stored image and one received image to permit comparison between the two images, and at the time of comparison only one of the images is required to be stored. In a preferred embodiment, a plurality of images from previous iterations of the algorithm are stored to potentially reduce the average computing workload per iteration. In one alternate embodiment, the received image is transformed into the plurality of candidate images in parallel. In an alternate embodiment, the received image is transformed into the plurality of candidate images in a serial fashion.

In an alternate embodiment of the invention, a motion detection algorithm is employed on one or more subsets of the received image and one or more subsets of the saved image, in a manner analogous to the block motion estimation method of Moving Picture Experts Group (MPEG) encoding standards. To support the use of standard MPEG components, the subsets may be selected as the blocks and macroblocks associated with the MPEG block motion vector algorithms. Alternatively, the subsets may represent specific recognizable features within a fingerprint such as a whorl, junction, parallel ridges and furrows, scar, or other such distinctive feature. The aggregate motion of the subsets may be averaged to determine the direction and magnitude of the motion of the skin texture. Alternatively, the average may be used as an initial candidate transformation where full-image correlation is performed as already described above.

Referring back to block 304, if no movement has occurred, the method includes continuing to store images and to analyze incoming images to determine whether movement has occurred. By way of example, the operation shown in blocks 202 and 204 may be carried out, for example, by the surface texture movement detection circuit 20.

In a preferred embodiment of the present invention, timestamps are associated with each stored image and with the received image. A timestamp is a measure of time elapsed from some reference. Examples of common timestamps comprise dates, time-of-day, a counter value produced responsive to a system clock or frequency reference, and an elapsed time counter. A time delta is computed by subtracting the timestamp value associated with a stored image from the timestamp value of the received image. As previously disclosed herein, direction and magnitude of motion of the skin texture are determined by comparison of a received image against one or more stored images. The magnitude of the motion of the skin texture divided by the time delta is the rate of motion of the skin texture. The rate of motion and the direction of motion together comprise complete information about the motion vector associated with the skin texture.

In an alternate embodiment, an elapsed time counter is started after each determination of direction and rate, and stopped and sampled at the beginning of each determination of direction and rate. The elapsed time counter thus provides the time delta directly without need for the subtracting step.

Figure 4:
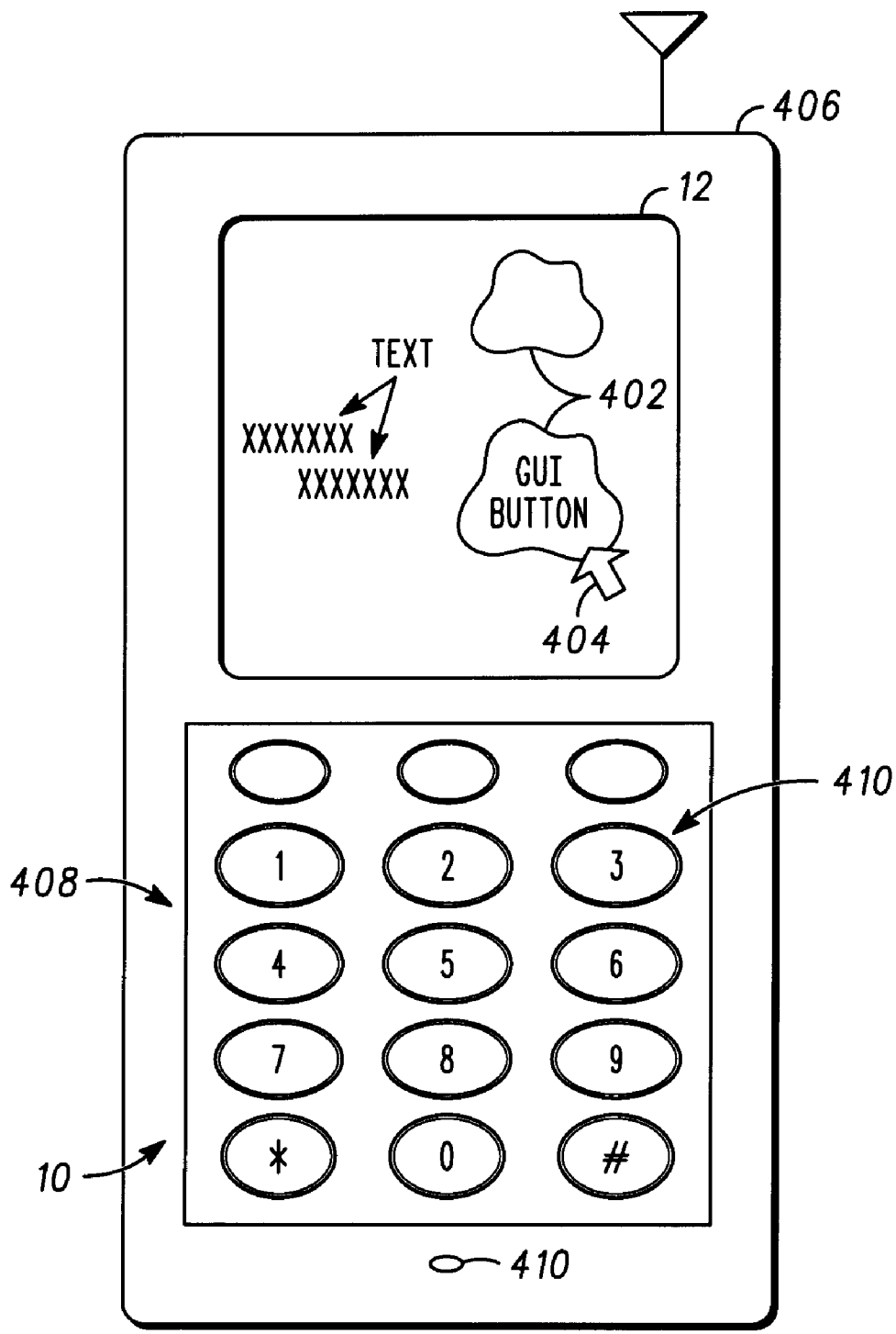
FIG. 4 is an illustration of an example of a mobile device incorporating a display pointing device in accordance with one embodiment of the invention.

FIG. 4 is an example of a mobile device 400, such as, but not limited to, a cellular telephone, personal digital assistant, internet appliance, wrist watch, telephone, personal information organizer or any other suitable mobile device. For purposes of illustration only, the mobile device 400 is shown to be a cellular telephone. The mobile device 400 includes a display 12 that includes graphic images 402 displayed thereon, and a cursor 404 that is controlled based on pointing output data 24 as known in the art. The mobile device 400 includes a housing 406 with the display 12 operatively attached to the housing. The display may be a flip display or any other suitable display. As shown, the mobile device 400 includes a wireless telephone subsystem generally indicated at 408 which includes a plurality of activation keys 410 to facilitate cellular telephone communication. The keys 410 may be depressible key pads, virtual keys presented as graphic images 402, or any other suitable keys. The mobile device 400 also includes a display pointing device 10 having a surface texture sensing window 410 as part of the surface texture sensing circuit 18. The surface texture movement detection circuit 20 may be a suitably programmed processor or processors within the mobile device 400 or any other suitable structure. The surface texture sensing window 410 is located on a non-bottom surface of the housing 406. As shown in this example, the surface texture sensing window 410 is located on a top surface of the mobile device 400. The surface texture sensing window 410 may be located on a side surface or any other suitable non-bottom surface as required by the design of the mobile device 400. Since the display pointing device 10 of the present invention does not require use of an external pad or undersurface, the surface texture sensing window 410 is located on a non-bottom surface. In addition, the surface texture sensing window 410 is relatively small since it only needs to detect small movement of a portion of a fingerprint. The fingerprint sensing window 410 can be as small as several rows of ridges and furrows in skin texture; because skin texture varies from user to user, the smallest practical size is on the order of 2.5 mm by 2.5 mm (6.25 sq mm). In a preferred embodiment, the surface texture sensing window 410 is on the order of 20 sq mm and of approximately square aspect ratio. The surface texture sensing window 410 does not need to be of rectangular shape and may comprise an arbitrary outline including non-contiguous regions. Sensing arrays are located behind or within the surface texture sensing window. The rows in the sensing arrays are close enough together in proximity to suitably detect a spatial representation of at least one of optical energy reflected from the finger and infrared energy emitted from the finger, depending upon the type of surface texture sensing circuit used. The sensing array may be constructed to use a very small surface area of the mobile device. It is generally not necessary to sense or resolve an image of a large area of a user's fingertip. The sensing window 410 is, for example, the surface that allows energy therethrough and is preferably sealed to prevent physical contaminants from entering inside the housing of the device.

Figure 5:
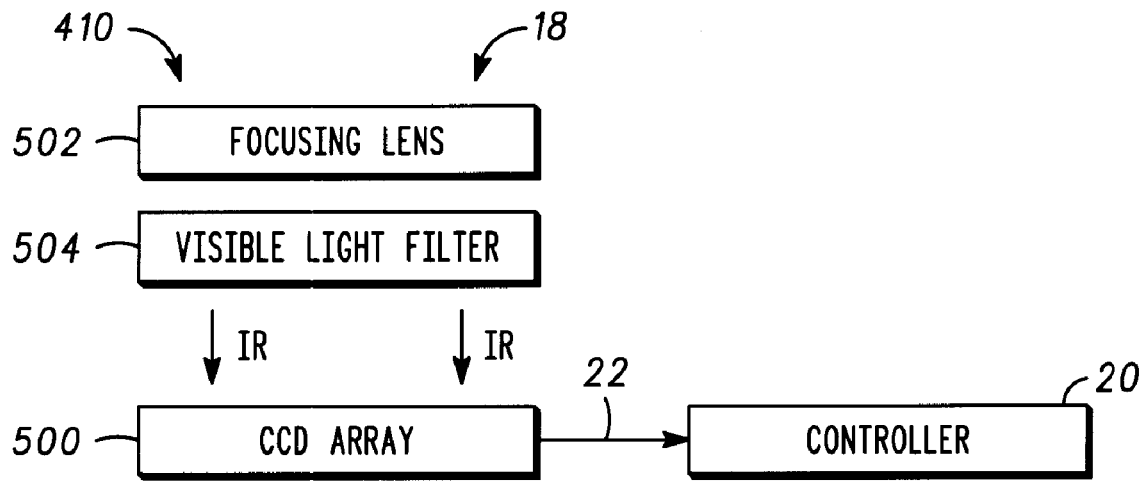
FIG. 5 is a block diagram illustrating one example of a surface texture sensor in accordance with one embodiment of the invention.

FIG. 5 illustrates a block diagram showing one example of a surface texture sensing circuit 18 using a CCD-based sensing array. As shown, a controller or other suitable control logic serves as the fingerprint movement detection circuit 20 and receives image data 22 from a charged coupled device array 500. A focusing lens 502, the top of which may serve as the sensing window 410, or a portion thereof, focuses light to the CCD array. Preferably, the focusing lens is designed so that visible or infrared light energy emitted within a height of approximately 5 mm from a top surface of the sensing window is focused on the CCD array but light originating beyond 5 mm from the top surface will be diffused. As such, direct contact with the sensing window is not necessary. A visible light filter 504, such as a suitable visible light filter film, may be interposed between the focusing lens and the CCD array 500 to filter out visible light but allow infrared energy to pass through to the CCD array 500. The visible light filter 504 serves as an optical filter that is in operative position to filter visible light from the charged coupled device array. As shown in this example, the image information 22 may be in an analog form, or digital form, depending upon the complexity of the CCD array 500.

Figure 6:
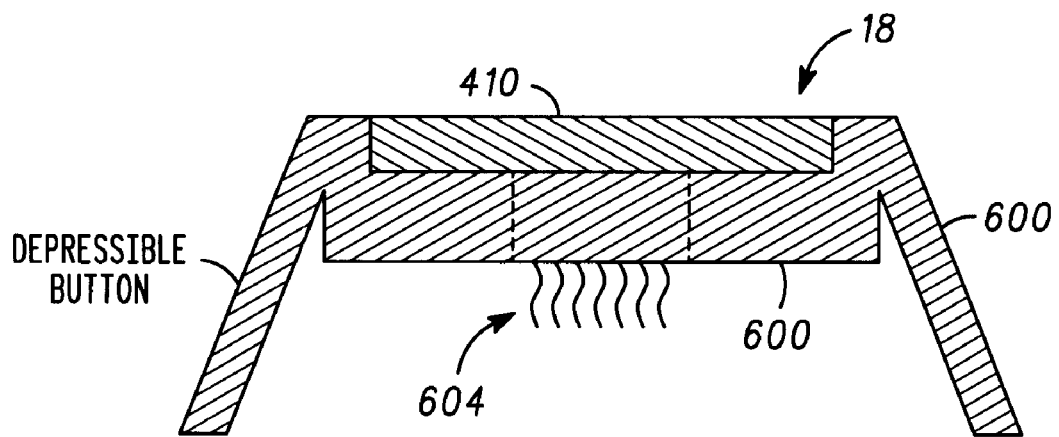
FIG. 6 illustrates a cross section of one example of a button containing an embedded surface texture sensing circuit in accordance with one embodiment of the invention.

FIG. 6 is a cross-section illustrating an example of an embedded display pointing device in accordance with one embodiment of the invention. As shown, a depressible button or key 600 houses the fingerprint sensing circuit 18 and hence sensing window 410. A suitable opening 602 is made in the button to pass any wiring 604 or connectors required to connect to a printed circuit board or other suitable interface. As such, a control button normally used as a "enter" key or other suitable key may also house the fingerprint sensing circuit 18, thereby minimizing the footprint required to accommodate the disclosed display pointing device. As such, the sensing window is co-located on a button or key. A user may position a cursor or text on a graphical user interface using the display pointing device and may use the button itself for the selecting and activating an operation associated with the mobile device.

Among other advantages, the disclosed pointing device has no moving parts. This advantage, among others, can result in lower manufacturing, operating, maintenance and repair costs. The disclosed pointing device is also less likely to be falsely triggered by inanimate objects moving past it, due to the close proximity required in the focus range and the requirement to resolve ridges and furrows associated with skin texture. Other advantages will be recognized by those of ordinary skill in the art. It will also be recognized that although described with respect to a mobile device, the instant display pointing device 10 may be employed in a non-mobile device including, but not limited to, printers, copiers, fax machines, desktop computers, navigation units or any other suitable devices.

It should be understood that the implementation of other variations and modifications of the invention and its various aspects will be apparent to those of ordinary skill in the art, and that the invention is not limited by the specific embodiments described. For example, wherein the sensing window may be located within a specific user control, such as a button or other area of the mobile device housing and the fingerprint sensing circuit is not otherwise coupled to the function of the specific user control. It is therefore contemplated to cover by the present invention, any and all modifications, variations, or equivalents that fall within the spirit and scope of the basic underlying principles disclosed and claimed herein.

What is claimed is:

1. A mobile device comprising:
a display;
a fingerprint sensing circuit mounted within a depressible key; and
a fingerprint movement detection circuit, operatively coupled to the fingerprint sensing circuit and to the display, and operative to determine a direction of movement independent of depression of the depressible key and a rate of movement, of skin texture being sensed by the fingerprint sensing circuit and to produce pointing output data for the display;
wherein the fingerprint movement detection circuit determines at least one of a rate and a direction of movement of the skin texture by:
modifying at least one of the previously stored images to produce a plurality of candidate displacement images each with an associated respective displacement movement vector;
and compares by correlating the resolved first image against each of the plurality of candidate displacement images to produce a plurality of respectively associated displacement correlation scores;
and wherein determining at least one of a rate and a direction of movement further includes:
choosing the highest displacement correlation score and providing the associated respective displacement movement vector to determine the direction of movement of the skin texture.

2. The mobile device of claim 1 including a wireless telephone subsystem operatively coupled to the display.

3. The mobile device of claim 1 wherein the fingerprint sensing circuit includes a sensing array including at least one of: a plurality of charge coupled devices (CCD's) and a plurality of thermal sensors.

4. The mobile device of claim 1 wherein the fingerprint sensing circuit includes an illumination source operatively positioned to provide illumination of the skin texture wherein sensing of the skin texture is responsive to the illumination.

5. The mobile device of claim 1 wherein the fingerprint sensing means includes a sensing array focusing mechanism operatively coupled to focus charge coupled devices to detect the skin texture.

6. The mobile device of claim 5 wherein the fingerprint sensing circuit includes an optical filter positioned interstitially between the skin texture and the charged coupled devices to filter visible light from the charge coupled devices.

7. The mobile device of claim 1 wherein the fingerprint movement detection circuit further comprises:
memory to store at least one previously stored image,
and wherein the fingerprint movement detection circuit iteratively:
resolves data received from the fingerprint sensing circuit to produce a new image;
compares the resolved new image to a previously stored image;
determines at least one of a rate and a direction of movement of the skin texture responsive to the comparison; and
stores the new image as a previously stored image.

8. The mobile device of claim 7 wherein the fingerprint movement detection circuit uses ridges and furrows in skin texture as a reference pattern when comparing the resolved new image to the previously stored image.

9. The mobile device of claim 7 wherein the fingerprint movement detection circuit:
modifies the first image to produce a plurality of candidate origination images each with an associated respective origination movement vector;
correlates at least one stored image against each of the plurality of candidate origination images to produce a plurality of respectively associated origination correlation scores; and
chooses the highest origination correlation score and provides the associated respective origination movement vector to determine the direction of movement of the skin texture.

10. The mobile device of claim 9 wherein the fingerprint movement detection circuit:
timestamps each resolved first image with an associated timestamp;
wherein the storing further:
records the timestamp associated with a respective stored image;
wherein the determining further:
computes the difference in time between the timestamp associated with at least one of the previously stored images and the timestamp associated with the first image and uses the computed time difference and the magnitude of the associated respective origination movement vector to determine the rate of movement of the skin texture.

11. The mobile device of claim 1 wherein the fingerprint movement detection circuit modifies by at least one of the image operations of translation, rotation, and scaling of the image.

12. The mobile device of claim 1 wherein the fingerprint movement detection circuit: timestamps each resolved first image with an associated time stamp;
records the timestamp associated with a respective stored image;
computes the difference in time between the timestamp associated with at least one of the previously stored images and the timestamp associated with the first image and uses the computed time difference and the magnitude of the associated respective displacement movement vector to determine the rate of movement of the skin texture.

13. The mobile device of claim 1 including a housing and wherein the fingerprint sensing circuit further comprises a sensing window located on a non-bottom surface of the housing.

14. The mobile device of claim 13 wherein the sensing window is located within a depressible button.

15. The mobile device of claim 13 wherein the sensing window is located within a specific user control of the mobile device, wherein the fingerprint sensing circuit is otherwise unrelated to the function of the specific user control.

16. The mobile device of claim 1 wherein the modifying includes at least one of the image operations of translation, rotation, and scaling.

17. The mobile device of claim 1 wherein the depressible key is a control key.

18. The mobile device of claim 17 wherein the depressible key comprises a generally flat overall top surface and a frame surrounding the sensing window.

19. A mobile device comprising:
a display;

a depressible multi-function key, comprising a sensing window co-located on the depressible key, the sensing window being part of a surface texture sensing circuit; and a surface texture movement detection circuit, operatively coupled to the surface texture sensing circuit and operative to determine direction of movement independent of depression of the depressible key, and operative to determine rate of movement of a texture over the sensing window and to produce pointing output data for the display and wherein the depressible key also functions as a non-pointing device based key.

20. The mobile device of claim 19 wherein the surface texture movement detection circuit comprises a sensing array focusing mechanism operative to detect texture of a finger wherein the sensing array focusing mechanism is adapted so that light emitted within a predetermined height above a top surface of the sensing window is focused on the sensing array.

* * * * *